United States Patent [19]

McLane

[11] 4,002,113
[45] Jan. 11, 1977

[54] COOKING APPARATUS

[76] Inventor: Jack S. McLane, 1853-B Vintage Court, Marietta, Ga. 30060

[22] Filed: Nov. 13, 1975

[21] Appl. No.: 631,716

Related U.S. Application Data

[63] Continuation-in-part of Ser. No. 187,972, Oct. 12, 1971, abandoned.

[52] U.S. Cl. .................................. 99/447; 99/450
[51] Int. Cl.² ...................................... A47J 37/04
[58] Field of Search ............ 99/445, 339, 340, 444, 99/446, 447, 450, 385

[56] References Cited

UNITED STATES PATENTS

| | | | |
|---|---|---|---|
| 2,604,033 | 7/1952 | Chadwick et al. | 99/447 |
| 2,638,888 | 5/1953 | Molla | 99/339 X |
| 2,780,215 | 2/1957 | Vacanti, Jr. | 126/25 A X |
| 2,790,434 | 4/1957 | Del Francia | 126/41 |
| 2,806,463 | 9/1957 | Smith | 126/25 A |
| 2,943,557 | 7/1960 | Suehlsen | 99/446 X |
| 3,455,233 | 7/1969 | Cable | 99/446 |
| 3,935,809 | 2/1976 | Bauer | 99/447 |

*Primary Examiner*—Harvey C. Hornsby
*Assistant Examiner*—Arthur O. Henderson
*Attorney, Agent, or Firm*—Jones, Thomas & Askew

[57] ABSTRACT

A cooking apparatus capable of effectively cooking food, such as steaks and hamburgers, without a flame flare-up of the greases or fats. The cooking apparatus includes an upwardly open container for supporting flavor producing means, such as chips and spices, with a cooking surface, such as a grill, supported above the container. The flavor supporting container provides heat dissipation means for directing heat to the cooking surface. Housing means is provided for supporting the cooking surface above the container, with the housing including heat producing means, air pressure means and air pressure directing means for supplying a controlled amount of hot air to the container for contact with the flavor producing means and transfer to the cooking surface. A distribution surface constructed of a formanious plate is provided between the cooking surface and the flavor supporting container for effectively distributing the hot air over the cooking surface. The combination of the hot air cooking medium, the effective distribution hot air to the cooking surface and the flavor producing means produce a reliable cooking operation without a flame flare-up of the greases while imparting a desirable flavor to the cooked food.

5 Claims, 5 Drawing Figures

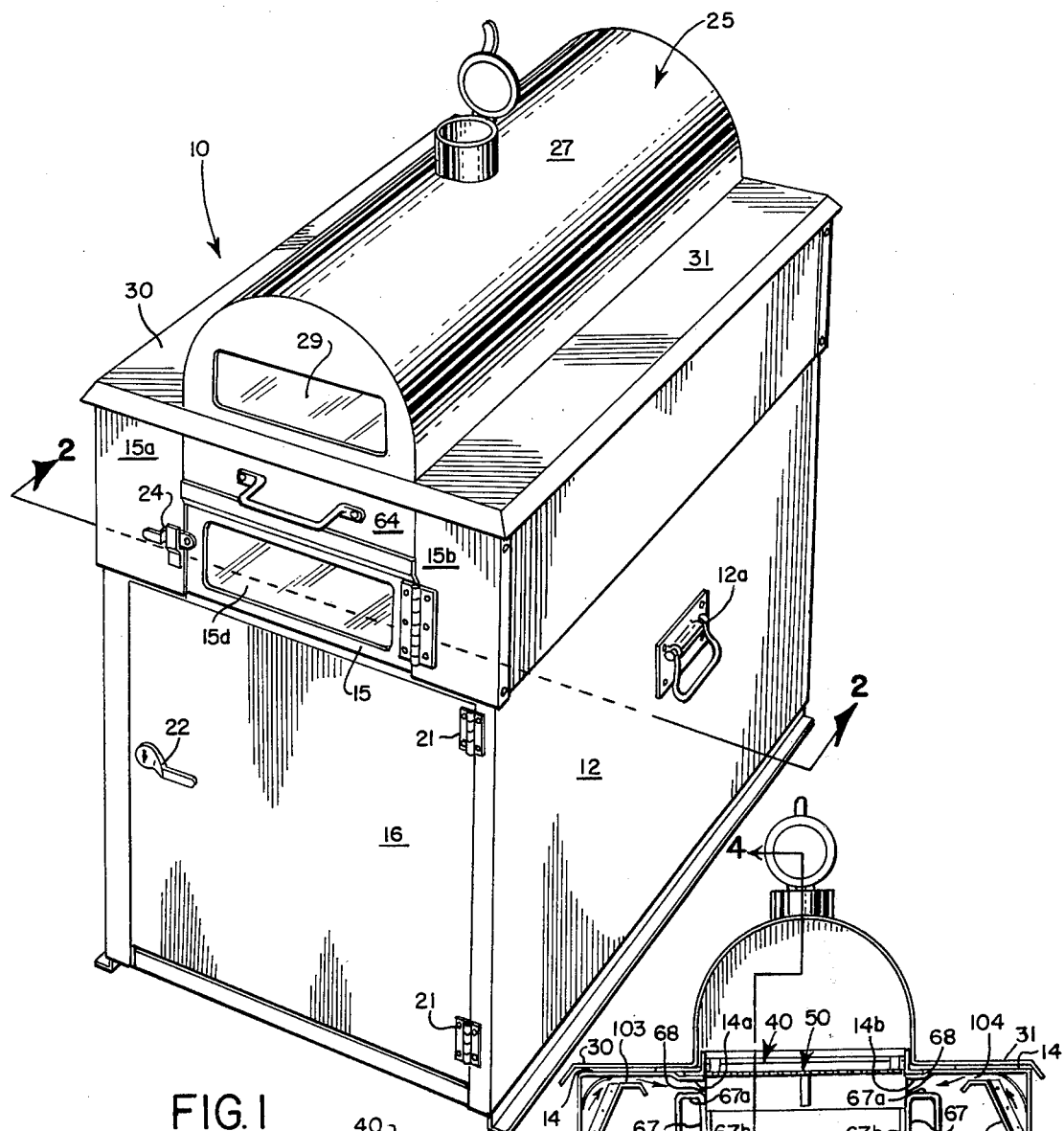
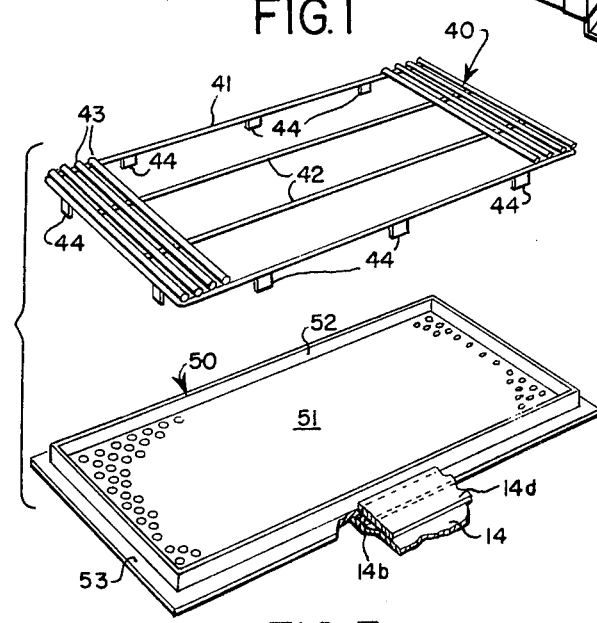
FIG.1
FIG.3
FIG.2

COOKING APPARATUS

CROSS REFERENCE TO RELATED APPLICATION

This is a continuation-in-part application to my earlier application Ser. No. 187,972 filed Oct. 12, 1971 for a "Cooking Apparatus", now abandoned.

BACKGROUND OF THE INVENTION

This invention relates to a cooking apparatus and is more particularly concerned with a grill type cooking apparatus.

Cooking grills are being used more than ever in our society because of our increased leisure time for enjoying such activities as cooking and camping. Charcoal type cooking grills are the most frequently used at home because of the improved flavor of the food cooked.

One major problem with using a charcoal type cooking grill is flame flare-up of the greases and fats which requires close attention to cooking on a grill without burning the food being cooked when a flame flare-up occurs.

With the prior art charcoal cooking grills a quantity of water is maintained close at hand for use in controlling flame flare-up of the greases and the use of water to control flame flare-up requires close attention to the cooking operation. Even with the use of water for attempting to control flame flare-up, flame flare-up often occurs causing the food to be burned or chared.

Further, charcoal type cooking grills cannot be used indoors because of the exhaust fumes produced in the burning of charcoal.

SUMMARY OF THE INVENTION

The above indicated disadvantages of the prior art charcoal cooking grills have been overcome by the present invention which basically includes hot air as the cooking medium and includes effective distribution of the hot air on the cooking surface.

One important feature of the present invention includes the use of a distribution surface constructed of a formanious, plate located between the cooking surface and the hot air supply means.

Another important feature of the present invention is the construction of the heat producing means which provides a controlled supply of hot air to the area below the cooking surface.

A further feature of the present invention includes the provision of flavor producing means located below the cooking surface and in a position for contact by the hot air to produce flavored vapors which can rise and contact the food being cooked.

It is therefore a primary object of the present invention to provide a cooking grill capable of effectively cooking food without flare flare-up of greases and fats.

Still another object of the present invention is to provide a grill type cooking apparatus which can impart flavor to the food and does not produce dangerous exhaust fumes.

An additional object of the present invention is to provide a cooking grill which is simple in construction and use, economical to manufacture and reliable in use.

These and other objects and advantages of the details of construction will become apparent after reading the following description of the illustrative embodiment, with reference to the attached drawings wherein like reference numerals have been used to refer to like parts throughout the drawings, and wherein:

BRIEF DESCRIPTION OF THE DRAWINGS

FIG. 1 is a perspective view of a cooking grill embodying the principles of the present invention;

FIG. 2 is a vertical sectional view taken along lines 2—2 of FIG. 1;

FIG. 3 is an exploded fragmentary perspective view of the grill cooking surface and hot air distribution surface;

DESCRIPTION OF THE ILLUSTRATIVE EMBODIMENT

Figure 4:
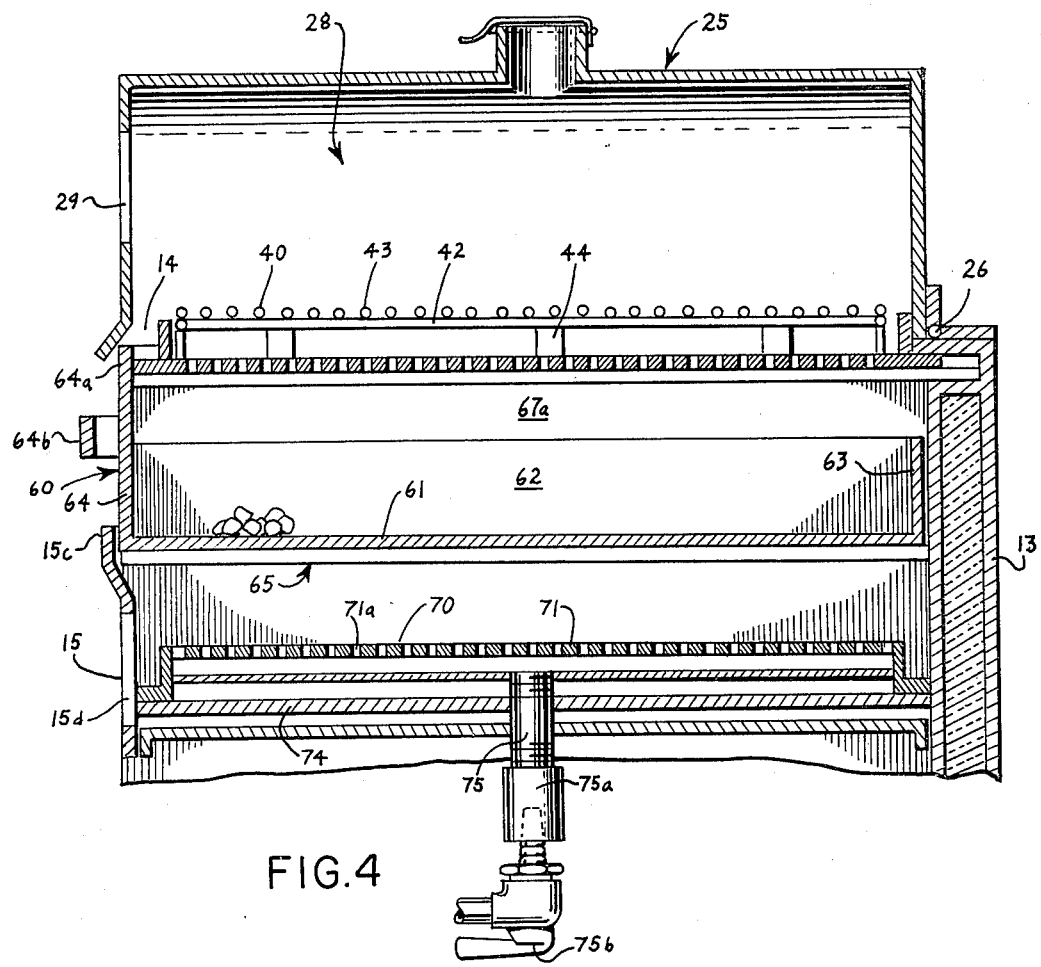
FIG. 4 is a fragmentary vertical sectional view taken along lines 4—4 of FIG. 2; and, FIG. 5 is a horizontal sectional view taken along lines 5—5 of FIG. 2.
Figure 5:
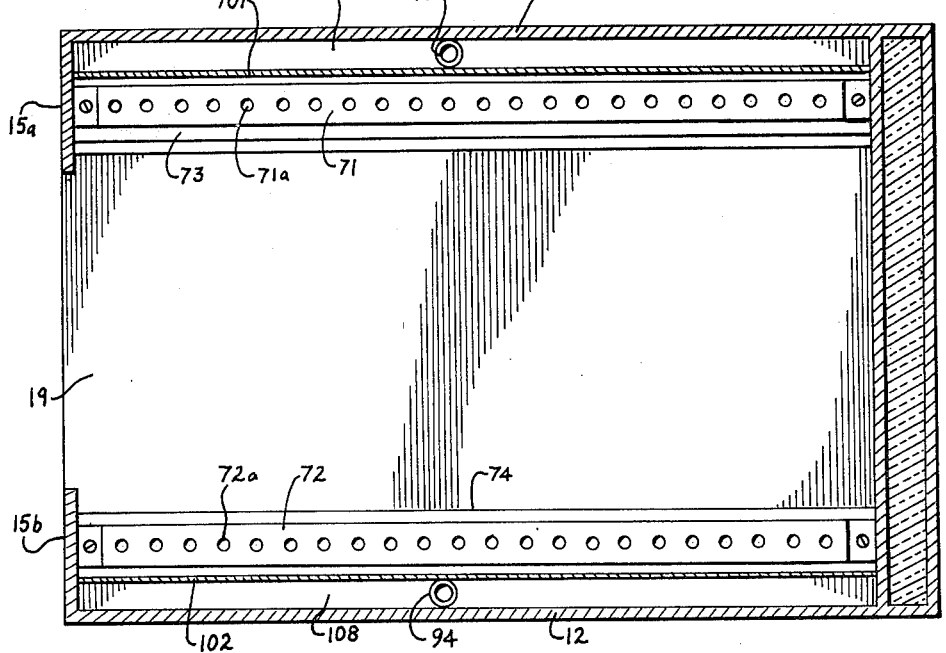

Referring now to the drawings, the cooking apparatus embodying the principles of the present invention is shown in the form of a cooking grill generally represented by the reference numeral 10.

Cooking grill 10 is constructed to include a housing having two sidewalls 11, 12 and a rearwall 13 and a top deck 14 defining an interior cavity. The housing is also provided with two doors 15, 16 for gaining access to the interior cavity. The interior cavity is divided into an upper compartment 17 and a lower compartment 18 by an intermediate shelf 19. A floor 20 is provided adjacent the bottom edges of the housing side and rearwalls and door 16. Door 16 is hingely connected at 21 for movement between open and closed position for gaining access to the lower compartment 18 and is secured in a closed locked position by locking handle 22 which is of conventional construction and requires key means for unlocking the handle. Door 15 is hingely connected at 23 for movement between open and closed positions and is secured in a closed position by latching means 24. The housing components are constructed of conventional metal stock material which are connected to form a rigid supporting structure by conventional means, such as welding and bolt means (not shown).

The cooking grill 10 is provided with a top enclosure 25 hingely connected at 26 (FIG. 4) for movement between open and closed positions. The top enclosure is formed to include a dome portion 27 for defining a cooking compartment 28 above the grill cooking surface 40, with the dome including a viewing window 29. A pair of flange portions 30, 31 extend horizontally on opposite sides of dome 27 to cover the grill top deck 14 when the top enclosure is in the closed position.

As shown in FIG. 3, the cooking grill 10 includes a grill cooking surface 40 constructed of a border rod 41, a number of horizontally spaced fore and aft extending rods 42 and a number of horizontally spaced transversely extending rods 43. A number of vertically extending support legs 44 are provided at spaced locations around border rod 41 to support the grill cooking surface 40 in a vertically spaced position above a distribution surface 50.

Distribution surface 50 is constructed to include a formanious distribution plate 51 having a vertically extending annular flange 53. The horizontal dimensions of plate 51 is detailed so that border 52 will extend up around the grill cooking surface 40 when the grill is supported on the distribution plate 50, with the grill cooking surface substantially aligned with the upper edge of border 52 and with the grill cooking surface 50 being easily removed from the distribution surface 50 for cleaning when needed.

As shown in FIGS. 2 and 3, the distribution surface 50 is removably supported on the housing top deck 14. The housing top deck 14 includes downwardly formed support edges 14a, 14b with plate members 14c, 14d connected to the top deck 14 above the downwardly formed edges 14a, 14b to define guide track means therebetween. The horizontal side flanges 53 of the distribution surface 50 are slidably supported in the guide tracks formed by formed edges 14a, 14b and plates 14c, 14d whereby the distribution surface can be removed from the top deck 14 for cleaning.

As shown in FIG. 4, the distribution surface 50 is held in a set position in the guide track means by the upper front edge of container means 60. Container means 60 includes a bottom 61, sidewall 62, rearwall 63 and frontwall 54 for defining an upwardly open container for use in supporting bar-be-que rock chips and spices for producing flavored vapor which will get hot and rise up around or against food supporting on cooking surface 40 to impart desired flavors to the cooked food. The container frontwall 64 is provided with an upper edge 64a which extends up in front of the distribution surface 50 to the distribution in a set position on top deck 14 and includes a handle 64b for use in removing container 60. Container 60, with supported bar-be-que rock and flavor means, is operable as a heat dissipation means for directing hot air cooking medium up to the cooking surface and with the formanious distribution plate 51 providing effective means for evenly distributing the hot air cooking medium over cooking surface 40.

Container 60 is supported for sliding movement between a closed operable position beneath the cooking surface and a displaced removed position by a substantially U-shaped guide track 65. Guide track includes a base supporting wall 66 and two upstanding sidewalls 67 detailed in horizontal spacing to be complimentary to the outside dimensions of container 60 and permit free sliding movement relative thereto. Guide track means is connected between the housing backwall 13 and housing frontwall panels 15a, 15b by conventional means, such as welding (not shown). Guide track means 65 is supported in a vertically spaced position above shelf 19 to allow the upper cavity 17 to be used as a food storage or food warming area.

As shown in FIG. 2, the sidewalls 67 of the guide track supporting means 65 is provided with horizontal flanges 67a spaced below top deck 14 to define entrance passageways 68, 69 which will permit the hot air cooking medium to enter the support container 60 for dissipation up to cooking surface 40. Vertical baffles 67b are integrally formed with flanges 67a and extend down to position below the base 66, with the baffles used to control flow of hot air from the heating means 70 up to entrance passageways 68, 69.

The heat producing means 70 includes two elongated heat producing manifolds 71, 72, with manifold 71 located substantially parallel to and adjacent sidewall 11 and manifold 72 located substantially parallel to and adjacent sidewall 12. The heat producing manifolds 71, 72 are supported on elongated brackets 73, 74, which are located on shelf 19 adjacent sidewalls 11, 12, respectively. Each of the manifolds is provided with a plurality of aperatures 71a, 72a, respectively, to allow a fuel, such as L.P. or natural gas, to be dispensed therefrom for burning to produce heat. Brackets 73, 74 and the shelf 19 beneath the brackets are provided with a number of openings to control air draft to the burning fuel.

As shown in FIG. 2, the manifolds 71, 72 are connected to conduit means 75, 76, having independent adjustable gas orfices 75a, 76a and value means 75b, 76b, respectively. Conduits 75, 76 are connected through a conventional pressure regulator 78 and flexible supply conduit 79 to a gas supply tanks 80. Tank 80 is supported in bottom compartment 18 and includes convention value control means 81. Heat produced by burning fuel dispensed from manifolds 71, 72 will rise up toward entrance passageways 68, 69, respectively, with the heat being transferred through the passageways by air pressure developed by air pressure generating means 90.

The air pressure generating means 90 is supported in housing lower compartment 18 (FIG. 2) and includes a conventional electrically driven blower 91 connected by a distribution conduit 92 to two air pressure supply conduits 93, 94. Blower 91 is provided with a conventional filter and intake opening (not shown) located in the housing bottom 20 and includes a conventional "on", "off" control switch 95 located adjacent the entrance to compartment 18.

As shown in FIGS. 2 and 6, the air pressure supply conduits 93, 94 extend through shelf 19 and are connected to intermediate portions of brackets 73, 74 adjacent sidewalls 11, 12 and are operable for introducing air pressure into air passageways 97, 98 defined between sidewalls 11, 12 and air baffles 101, 102, respectively. The baffles 101, 102 are located between heat producing manifolds 71, 72 and sidewalls 11, 12 and extend from the surface of brackets 73, 74 to a position slightly below top deck 14 to define air pressure directing orifices 103, 104, respectively. Baffles 101, 102 are formed adjacent their upper edges so as to locate the orfices 103, 104 over the heat producing manifolds 71, 72 and so as to direct the air pressure from the orfices into passageways 67a. Heat from the heat producing manifolds 71, 72 is mixed with air passing through orfices 103, 104 before the air enters passageways 67a.

As shown in FIGS. 1 and 4, the upper edge of door 15 includes a flared portion 15c which extends up in front of container 60 for maintaining container 60 in place when door 15 is closed and secured by latching means 24. Door 15 is also provided with a viewing window 15d to allow observation of food in compartment 17 and operation heat producing manifolds 71, 72.

The housing sidewalls 11, 12 are provided with conventional handles 11a, 12a to aid in movement of the cooking apparatus.

OPERATION

In utilizing the cooking grill 10 embodying the principles of the present invention, the user would first locate bar-be-que rocks and other desired flavor producing spices and chips in the support container 60. Container 60 can be easily removed for this purpose by releasing latch 24 to open door 15 to remove the upper edge 15c of the door from in front of container 60, after which the container can be pulled forward. After the desired flavor producing means have been placed in container 60 and returned to the closed position beneath the cooking surface, further operation of the cooking grill 10 is effected by initiating operation of the air pressure means 90 and operation of the heat producing means 70. The air pressure means 90 is started by moving switch 95 to the "on" position and heat producing means 70 is started by opening valve 81 to allow fuel to flow to manifolds 71, 72 for dispensing through openings 71a, 72a. After the fuel has started to flow, the fuel is ignited by holding suitable flame means adjacent the fuel flowing from the manifolds. The amount of draft provided to each manifold can be changed by effecting adjustment of the independent adjustment orfices 75a, 76a.

With the heat producing means and air pressure means operating, the heat rising from manifolds 71 and 72 is mixed with air flowing through orfices 103, 104 and the hot air is directed through passageways 68, 69 into container 60 where the hot air will contact the flavor producing means to cause desirable flavored vapors to rise up through distribution plate 51 to the cooking surface 40. The hot air entering container 60 will be dissipated upwardly to the cooking surface 40. As the rising hot air contacts distribution plate 51, the hot air will be evenly distributed over the cooking surface 40. The hot air passing through the openings in the distribution plate 51 will bombard food supported thereon to effectively cook the food and will also tenderize meat being cooked.

The top enclosure 25 can be pivoted to an open position to gain access to the cooking surface 40 and can be returned to a closed position during cooking, if desired. Window 14 will permit the user to view food being cooked without opening enclosure 25.

After the desired food has been cooked, the operation of the grill 10 is stopped by closing valve 81 to stop flow of fuel to manifolds 71, 72 and by moving switch 95 to the "off" position to stop the air pressure blower 91 by allowing blower 91 to operate a short period after the heat producing means has been stopped, the air pressure can be utilized to cool the cooking grill 10.

The cooking surface 40, distribution surface 60 and container 60 can be easily removed and separated for cleaning after use.

The above described heat producing means 70 illustrates the use of gas as a heat producing medium. However, other heat producing means, such as electric heating coils could be used and if gas is used, the source of gas can be supplied either by portable tank means or can be supplied by a natural gas supply line.

The cooking grill 10 shows a housing structure for supporting the cooking surface at a desired height. However, the lower portion of the housing structure could be eliminated and the grill could be supported on suitable counter means.

Since the cooking fuel used does not produce poisonous exhaust fumes, the cooking grill 10 can be used either in doors or out doors.

The wall structures of the housing could be provided with suitable insulation means, as shown in the rearwall 13, (FIG. 4) when it is necessary to protect surrounding cabinet structure.

Exhaust fan means could be used with the cooking grill 10 for removing cooking fumes and odors without effecting the cooking operation of the grill.

It now becomes apparent that the above described illustrative embodiment of a cooking grill is capable of obtaining the above stated objects and advantages. It is obvious that those skilled in the art may make modifications in the details of construction without departing from the spirit of the invention which is to be limited only by the scope of the appended claims.

I claim:
1. A grill type cooking apparatus comprising a housing, a source of heat at a lower portion of said housing, a grill cooking surface located above said source of heat, an open container positioned beneath said grill cooking surface for holding flavoring means or the like, and means in said housing for directing heated air from said source of heat first in upward directions from said source of heat and then in lateral directions over said container and then in upward directions through said grill.

2. The grill type cooking apparatus of claim 1 and wherein said means for directing heated air from said source of heat comprises baffle means for confining the heated air internally away from said housing until the heated air has reached the height of the upper portion of said container, and air supply means for directing a flow of unheated air upwardly between said baffle means and said housing, said baffle being shaped to direct the flow of unheated air upwardly in said housing until the unheated air has reached the height of the upper portion of said container and then in a lateral direction over said container to mix with the heated air.

3. The grill type cooking apparatus of claim 1 and further including an air distribution means positioned between said grill cooking surface and said container for distributing the air across said grill cooking surface.

4. The grill type cooking apparatus of claim 1 and further including a foramenous air distribution plate positioned between said grill cooking surface and said container.

5. The grill type cooking apparatus of claim 1 and wherein said source of heat comprises gas burners positioned to direct gas flames upwardly toward and beside said open top container.

* * * * *